United States Patent
Oshima et al.

(10) Patent No.: US 6,403,742 B2
(45) Date of Patent: Jun. 11, 2002

(54) OLEFIN COPOLYMER HAVING FUNCTIONAL GROUP, PRODUCTION PROCESS THEREOF AND RUBBER COMPOSITION

(75) Inventors: Noboru Oshima; Youichirou Maruyama; Katsutoshi Sawada; Syouei Tsuji, all of Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/737,963

(22) Filed: Dec. 18, 2000

(30) Foreign Application Priority Data

Dec. 27, 1999 (JP) ............................................ 11-371731

(51) Int. Cl.$^7$ ................................................ C08F 232/08
(52) U.S. Cl. .................. 526/281; 526/308; 526/309; 526/336; 526/339; 526/348
(58) Field of Search ................................ 526/281, 336, 526/339, 348, 308, 309

(56) References Cited

U.S. PATENT DOCUMENTS

| 3,796,687 | A | | 3/1974 | Collete et al. |
| 3,884,888 | A | * | 5/1975 | Collette |
| 3,901,860 | A | | 8/1975 | Collete et al. |
| 4,987,200 | A | | 1/1991 | Datta et al. |
| 5,030,370 | A | | 7/1991 | Patil et al. |
| 5,756,623 | A | * | 5/1998 | Kreuder ...................... 526/308 |
| 5,863,986 | A | * | 1/1999 | Herrmann-Schonherr .... 525/63 |
| 6,008,298 | A | * | 12/1999 | Hatke ......................... 525/210 |

FOREIGN PATENT DOCUMENTS

| EP | 0 694 567 | 1/1996 |
| EP | 0 694 568 | 1/1996 |
| EP | 0 816 387 | 1/1998 |
| JP | 1-240517 | 9/1989 |
| JP | 1-259012 | 10/1989 |
| JP | 10-330429 | 12/1998 |

* cited by examiner

Primary Examiner—Fred Zitomer
(74) Attorney, Agent, or Firm—Oblon, Spivak, McClelland, Maier & Neustadt, P.C.

(57) ABSTRACT

An olefin copolymer having a functional group and having a structural unit (a) derived from ethylene, a structural unit (b) derived from an α-olefin having 3 to 12 carbon atoms, and a structural unit (c) derived from a cycloolefin, exhibits an intrinsic viscosity [η] of 0.1 to 10 dl/g as measured in decalin at 135° C. and can be used in a rubber composition.

17 Claims, No Drawings

OLEFIN COPOLYMER HAVING FUNCTIONAL GROUP, PRODUCTION PROCESS THEREOF AND RUBBER COMPOSITION

BACKGROUND OF THE INVENTION

1. Field of the Invention

The present invention relates to an olefin copolymer having a functional group, a production process thereof and a rubber composition comprising the olefin copolymer having the functional group, and more particularly to an olefin copolymer having a functional group, which permits providing an elastomer excellent in adhesion to and compatibility with other materials, coating property, printability and durability, and suitable for use as a material for automotive parts, mechanical parts, electronic parts, civil engineering and construction materials, etc., a production process thereof, and a rubber composition comprising the olefin copolymer having the functional group.

2. Description of the Background Art

Olefin copolymer elastomers such as ethylene/α-olefin copolymer elastomers and ethylene/α-olefin/nonconjugated diene copolymer elastomers have heretofore been widely used as materials for automotive parts, mechanical parts, civil engineering and construction materials, etc. because they are elastomeric materials excellent in heat resistance and weather resistance. The olefin copolymer elastomers are also widely used as modifiers for resins such as polypropylene and polyethylene.

However, such olefin copolymer elastomers involve problems that they have neither polar group nor functional group in their molecular structures, and so their adhesion to metals, and adhesion to and compatibility with other elastomers and resins than polyolefins are low, and the resulting molded or formed products are inferior in coating property and printability.

For such reasons, olefin copolymers with a functional group such as a carboxyl group or amino group introduced by using a cycloolefin having such a functional group as a monomer component have been proposed (see Japanese Patent Publication No. 43275/1974, Japanese Patent Application Laid-Open Nos. 259012/1989 and 54009/1989, Japanese Patent Application Laid-Open No. 503963/1992 (through PCT route), etc.).

However, such olefin copolymers with the functional group introduced thereinto have the following problems.

Namely, an active tertiary hydrogen atom (hydrogen atom bonded to a tertiary carbon atom) produced by substitution of a hydrogen atom with the functional group is present in a structural unit derived from the cycloolefin having the functional group, in other words, the tertiary hydrogen atom is bonded to a carbon atom to which the functional group has been bonded. When such a tertiary hydrogen atom is present in the copolymer, the tertiary hydrogen atom tends to separate from the carbon atom to produce a radical. Therefore, such a copolymer is apt to cause scission of a molecular chain, deterioration by oxidation and deterioration by the separation of a substituent group containing the functional group due to the formation of the radical. Accordingly, it is difficult to provide an elastomer excellent in durability by the olefin copolymer in which the functional group has been introduced.

In addition, a cycloolefin having, for example, a carboxyl group as a functional group gives off a strong odor. When such a cycloolefin is used as a monomer, the resulting copolymer also gives off a strong odor because the cycloolefin unavoidably remains in the copolymer. Therefore, such a copolymer involves an environmental or sanitary problem.

SUMMARY OF THE INVENTION

The present invention has been made on the basis of the foregoing circumstances, and it is the first object of the present invention to provide an olefin copolymer having a functional group, which permits providing an elastomer which is high in adhesion to and compatibility with other materials, coating property and printability and excellent in durability, and gives off no or little odor.

The second object of the present invention is to provide a process capable of exactly producing an olefin copolymer having a functional group, which permits providing an elastomer which is high in adhesion to and compatibility with other materials, coating property and printability and excellent in durability, and gives off no or little odor.

The third object of the present invention is to provide a rubber composition, which permits providing an elastomer which is high in adhesion to and compatibility with other materials, coating property and printability and excellent in durability, mechanical properties and abrasion resistance, and gives off no or little odor.

According to the present invention, there is thus provided an olefin copolymer having a functional group, which comprises:

a structural unit (a) derived from ethylene, a structural unit (b) derived from an α-olefin having 3 to 12 carbon atoms, and a structural unit (c) represented by the following general formula (1), and has an intrinsic viscosity [η] of 0.1 to 10 dl/g as measured in decalin at 135° C.;

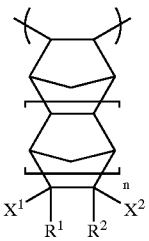

wherein $X^1$ and $X^2$ mean, independently of each other, a hydrogen atom, a hydrocarbon group or the following specific functional group, at least one of $X^1$ and $X^2$ is the specific functional group, $R^1$ and $R^2$ denote, independently of each other, a hydrogen atom or a hydrocarbon group having 1 to 10 carbon atoms, one of $R^1$ and $R^2$, which is bonded to a carbon atom to which the specific functional group is bonded, is the hydrocarbon group having 1 to 10 carbon atoms, and n stands for an integer of 0 to 2;

Specific Functional Group a functional group selected from the group consisting of a hydroxyl group, a hydrocarbon group to which a hydroxyl group is bonded, a carboxyl group, a hydrocarbon group to which a carboxyl group is bonded, a primary or secondary amino group, a hydrocarbon group to which a primary or secondary amino group is bonded, a quaternary ammonium salt of a primary or secondary amino group and a hydrocarbon group to which a primary or secondary amino group is bonded, an amide group having at least one active hydrogen atom bonded to a nitrogen atom, a hydrocarbon group to which such a amide group is bonded, and an imide group composed of $X^1$ and $X^2$ and represented by —CO—NH—CO—.

According to the present invention, there is also provided an olefin copolymer having a functional group, which comprises:
   a structural unit (a) derived from ethylene,
   a structural unit (b) derived from an α-olefin having 3 to 12 carbon atoms,
   a structural unit (c) represented by the above-described general formula (1), and
   a structural unit (d) derived from a nonconjugated diene, and has an intrinsic viscosity [η] of 0.1 to 10 dl/g as measured in decalin at 135° C.

In the olefin copolymers having the functional group according to the present invention, it may be preferable that proportion of the structural unit (a) derived from ethylene be 5 to 90 mol %, the structural unit (b) derived from the α-olefin having 3 to 12 carbon atoms be 5 to 60 mol %, the structural unit (c) represented by the general formula (1) be 0.01 to 30 mol %, and the structural unit (d) derived from a nonconjugated diene be 0 to 12 mol %.

In the olefin copolymers having the functional group according to the present invention, the structural unit (c) represented by the general formula (1) may preferably be such that only one of $X^1$ and $X^2$ in the general formula (1) is the specific functional group, and $R^1$ or $R^2$, which is bonded to the carbon atom to which the specific functional group is bonded, is a hydrocarbon group having 1 or 2 carbon atoms, and particularly that the other of $X^1$ and $X^2$ is a hydrogen atom, and $R^1$ or $R^2$, which is bonded to the carbon atom to which the hydrogen atom is bonded, is a hydrogen atom.

In the olefin copolymers having the functional group according to the present invention, the glass transition temperature may preferably be −90 to 50° C., more preferably −70 to 10° C.

According to the present invention, there is further provided a process for producing an olefin copolymer having a functional group, which comprises the steps of:
   reacting a functional group-containing cycloolefin represented by the following general formula (2) with an organometallic compound comprising a metal selected from metals of Groups 2, 12 and 13 of the periodic table, and
   polymerizing the resulting reaction product with ethylene, an α-olefin having 3 to 12 carbon atoms and a nonconjugated diene optionally used in the presence of a catalyst composed of a transition metal compound and an organoaluminum compound;

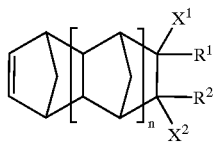

wherein $X^1$ and $X^2$ mean, independently of each other, a hydrogen atom, a hydrocarbon group or the following specific functional group, at least one of $X^1$ and $X^2$ is the specific functional group, $R^1$ and $R^2$ denote, independently of each other, a hydrogen atom or a hydrocarbon group having 1 to 10 carbon atoms, one of $R^1$ and $R^2$, which is bonded to a carbon atom to which the specific functional group is bonded, is the hydrocarbon group having 1 to 10 carbon atoms, and n stands for an integer of 0 to 2;
Specific Functional Group
a functional group selected from the group consisting of a hydroxyl group, a hydrocarbon group to which a hydroxyl group is bonded, a carboxyl group, a hydrocarbon group to which a carboxyl group is bonded, a primary or secondary amino group, a hydrocarbon group to which a primary or secondary amino group is bonded, a quaternary ammonium salt of a primary or secondary amino group and a hydrocarbon group to which a primary or secondary amino group is bonded, an amide group having at least one active hydrogen atom bonded to a nitrogen atom, a hydrocarbon group to which such a amide group is bonded, and an imide group composed of $X^1$ and $X^2$ and represented by —CO—NH—CO—.

In the process for producing the olefin copolymer having the functional group according to the present invention, the organometallic compound comprising the metal selected from metals of Groups 2, 12 and 13 of the periodic table may preferably be an organoaluminum compound.

The organometallic compound comprising the metal selected from metals of Groups 2, 12 and 13 of the periodic table may preferably be used in a proportion of at least 0.8 equivalents per equivalent of the functional group in the functional group-containing cycloolefin represented by the general formula (2).

According to the present invention, there is still further provided a rubber composition comprising:
   (A) the olefin copolymer having the functional group described above, and
   (B) a vulcanizing agent and/or a crosslinking agent.

The rubber composition according to the present invention may comprise (C) an olefin copolymer having no functional group.

In such a rubber composition, (C) the olefin copolymer having no functional group may preferably be a copolymer comprising a structural unit derived from ethylene and a structural unit derived from an α-olefin having 3 to 12 carbon atoms, and/or a copolymer comprising a structural unit derived from ethylene, a structural unit derived from an α-olefin having 3 to 12 carbon atoms and a structural unit derived from a nonconjugated diene.

A ratio of (A) the olefin copolymer having the functional group described above to (C) the olefin copolymer having no functional group may preferably be 1:99 to 99:1 in terms of a weight ratio.

DETAILED DESCRIPTION OF THE PREFERRED EMBODIMENTS

The embodiments of the present invention will hereinafter be described in detail.

The olefin copolymer having the functional group (hereinafter also referred to as "the functional group-containing olefin copolymer") according to the present invention comprises a structural unit (a) (hereinafter also referred to as "the structural unit (a)" merely) derived from ethylene, a structural unit (b) (hereinafter also referred to as "the structural unit (b)" merely) derived from an α-olefin (hereinafter also referred to as "the specific α-olefin") having 3 to 12 carbon atoms and a structural unit (c) (hereinafter also referred to as "the structural unit (c)" merely) represented by the above-described general formula (1), and optionally a structural unit (d) (hereinafter also referred to as "the structural unit (d)" merely) derived from a nonconjugated diene.

In the functional group-containing olefin copolymer according to the present invention, the structural unit (a) is preferably contained in a range of 5 to 90 mol %, more preferably 10 to 85 mol %, particularly preferably 15 to 80 mol % based on the whole structural unit.

When the proportion of the structural unit (a) contained is 5 mol % or higher, a functional group-containing cycloolefin represented by the general formula (2), which will be described subsequently, can be easily copolymerized therewith, and moreover the resulting copolymer tends to provide an elastomer having excellent durability. When the proportion of the structural unit (a) is 90 mol % or lower on the other hand, a copolymer exhibiting the behavior as an elastomer is provided with ease.

The specific α-olefin used for forming the structural unit (b) is an α-olefin having 3 to 12 carbon atoms, and specific examples thereof include propylene, 1-butene, 1-pentene, 4-methylpentene-1, 1-hexene, 1-heptene, 1-octene, 1-decene, 1-dodecene, styrene and p-methylstyrene. These compounds may be used either singly or in any combination thereof.

When the α-olefin having at most 12 carbon atoms is used, the copolymerizability of such an α-olefin with other monomers is easy to become satisfactory.

The structural unit (b) is preferably contained in a range of 5 to 60 mol %, more preferably 10 to 55 mol %, particularly preferably 15 to 50 mol % based on the whole structural unit.

When the proportion of the structural unit (b) contained is 5 mol % or higher, the resulting copolymer tends to provide an elastomer having sufficient elasticity. When the proportion of the structural unit (b) is 60 mol % or lower on the other hand, an elastomer obtained from the resulting copolymer tends to have good durability.

The structural unit (c) is a structural unit represented by the general formula (1) and formed by the functional group-containing cycloolefin (hereinafter also referred to as "the specific functional group-containing cycloolefin") represented by the general formula (2).

In the general formulae (1) and (2), groups $X^1$ and $X^2$ mean, independently of each other, a hydrogen atom, a hydrocarbon group or a specific functional group, and at least one of $X^1$ and $X^2$ is the specific functional group.

The specific functional group is a functional group selected from the group consisting of a hydroxyl group, a hydrocarbon group to which a hydroxyl group is bonded, a carboxyl group, a hydrocarbon group to which a carboxyl group is bonded, a primary amino group and a secondary amino group, a hydrocarbon group to which a primary or secondary amino group is bonded, a quaternary ammonium salt of a primary or secondary amino group or of a hydrocarbon group to which a primary or secondary amino group is bonded, an amide group having at least one active hydrogen atom bonded to a nitrogen atom, a hydrocarbon group to which such an amide group is bonded, and an imide group composed of $X^1$ and $X^2$ and represented by —CO—NH—CO—. In the hydrocarbon groups to which the hydroxyl group is bonded, the hydrocarbon groups to which the carboxyl group is bonded, and the hydrocarbon groups to which the amino group is bonded, or the quaternary ammonium salts thereof, the number of carbon atoms is preferably 1 to 5, excluding those of substituent groups thereof.

$R^1$ and $R^2$ denote, independently of each other, a hydrogen atom or a hydrocarbon group having 1 to 10 carbon atoms, and one of $R^1$ and $R^2$, which is bonded to a carbon atom to which the specific functional group is bonded, is the hydrocarbon group having 1 to 10 carbon atoms.

The value of the number n of repeated structural units is an integer of 0 to 2.

The structural unit (c) is preferably such that only one of groups $X^1$ and $X^2$ in the general formula (1) is the specific functional group, and the group $R^1$ or $R^2$, which is bonded to the carbon atom to which the specific functional group is bonded, is a hydrocarbon group having 1 or 2 carbon atoms, in that the decomposition of the resulting copolymer is hard to occur, and an elastomer having excellent durability is provided. In particular, the structural unit (c) is preferably such that that the other of the groups $X^1$ and X2 is a hydrogen atom, and the group $R^1$ or $R^2$, which is bonded to the carbon atom to which the hydrogen atom is bonded, is a hydrogen atom.

The specific functional group is preferably —COOH (carboxyl group), —NH$_2$ (amino group), —NHCH$_3$ (aminomethyl group), —CONH$_2$ or —CONR$^3$H (in which R$^3$ means an alkyl group). Of these groups, —COOH (carboxyl group), —CONH$_2$ or —CONR$^3$H is more preferred.

If the number of repeated structural units a in the general formula (2) is 3 or more, it is difficult to copolymerize such a functional group-containing cycloolefin with other monomers.

The specific functional group-containing cycloolefin used for forming the structural unit (c) is prepared by condensing cyclopentadiene with a functional group-containing olefin by the Diels-Alder reaction and optionally subjecting the reaction product to a hydrolytic reaction.

Specific examples of such a specific functional group-containing cycloolefin include:

5,6-dimethyl-5,6-dihydroxy-bicyclo[2.2.1]-2-heptene,
5,6-dimethyl-5,6-dicarboxy-bicyclo[2.2.1]-2-heptene,
5,6-diethyl-5,6-dicarboxy-bicyclo[2.2.1]-2-heptene,
5,6-dimethyl-5,6-bis(carboxymethyl)-bicyclo-[2.2.1]-2-heptene,
5,6-diethyl-5,6-bis(carboxymethyl)-bicyclo-[2.2.1]-2-heptene,
5,6-dimethyl-5,6-bis(hydroxymethyl)-bicyclo-[2.2.1]-2-heptene,
5,6-diethyl-5,6-bis(hydroxymethyl)-bicyclo-[2.2.1]-2-heptene,
5,6-dimethyl-5,6-bis(aminomethyl)-bicyclo[2.2.1]-2-heptene,
5,6-diethyl-5,6-bis(aminomethyl)-bicyclo[2.2.1]-2-heptene,
5,6-dimethyl-5,6-bis(aminopropyl)-bicyclo[2.2.1]-2-heptene,
5,6-dimethyl-5,6-bis(aminocarbonyl)-bicyclo-[2.2.1]-2-heptene,
5,6-dimethyl-5,6-bis(N-methyl-aminocarbonyl)-bicyclo[2.2.1]-2-heptene,
5,6-dimethyl-5,6-bis(N-propyl-aminocarbonyl)-bicyclo[2.2.1]-2-heptene,
5,6-diethyl-5,6-bis(aminocarbonyl)-bicyclo-[2.2.1]-2-heptene,
5,6-diethyl-5,6-bis(N-ethyl-aminocarbonyl)-bicyclo[2.2.1]-2-heptene,
5,6-dimethyl-bicyclo[2.2.1]-2-heptene-5,6-decarboxylic acid imide,
5-methyl-5-hydroxy-bicyclo[2.2.1]-2-heptene,
5-methyl-5-carboxy-bicyclo[2.2.1]-2-heptene,
5-ethyl-5-carboxy-bicyclo[2.2.1]-2-heptene,
5-methyl-5-hydroxymethyl-bicyclo[2.2.1]-2-heptene,
5-ethyl-5-hydroxymethyl-bicyclo[2.2.1]-2-heptene,
5-methyl-5-carboxymethyl-bicyclo[2.2.1]-2-heptene,
5-ethyl-5-carboxymethyl-bicyclo[2.2.1]-2-heptene,
5-methyl-5-aminomethyl-bicyclo[2.2.1]-2-heptene,
5-ethyl-5-aminomethyl-bicyclo[2.2.1]-2-heptene, 5-methyl-5-aminopropyl-bicyclo[2.2.1]-2-heptene,
5-methyl-5-aminocarbonyl-bicyclo[2.2.1]-2-heptene,
5-methyl-5-N-methyl-aminocarbonyl-bicyclo[2.2.1]-2-heptene,
5-methyl-5-N-propyl-aminocarbonyl-bicyclo[2.2.1]-2-heptene,
5-ethyl-5-aminocarbonyl-bicyclo[2.2.1]-2-heptene,
5-ethyl-5-N-ethyl-aminocarbonyl-bicyclo[2.2.1]-2-heptene,
8,9-dimethyl-8,9-dicarboxy-tetracyclo-[4.4.0.1$^{2,5}$.1$^{7,10}$]-3-dodecene,
8,9-diethyl-8,9-dicarboxy-tetracyclo-[4.4.0.1$^{2,5}$.1$^{7,10}$]-3-dodecene,
8,9-dimethyl-8,9-bis(hydroxymethyl)-tetracyclo-[4.4.0.1$^{2,5}$.1$^{7,10}$]-3-dodecene,
8,9-diethyl-8,9-bis(hydroxymethyl)-tetracyclo-[4.4.0.1$^{2,5}$.1$^{7,10}$]-3-dodecene,
8,9-dimethyl-8,9-bis(aminomethyl)-tetracyclo-[4.4.0.1$^{2,5}$.1$^{7,10}$]-3-dodecene,
8,9-diethyl-8,9-bis(aminomethyl)-tetracyclo-[4.4.0.1$^{2,5}$.1$^{7,10}$]-3-dodecene,
8,9-dimethyl-8,9-bis(aminocarbonyl)-tetracyclo-[4.4.0.1$^{2,5}$.1$^{7,10}$]-3-dodecene,
8,9-dimethyl-8,9-bis(N-methyl-aminocarbonyl)-tetracyclo[4.4.0.1$^{2,5}$.1$^{7,10}$]-3-dodecene,
8,9-diethyl-8,9-bis(aminocarbonyl)-tetracyclo-[4.4.0.1$^{2,5}$.1$^{7,10}$]-3-dodecene,
8,9-diethyl-8,9-bis(N-ethylaminocarbonyl)-tetracyclo[4.4.0.1$^{2,5}$.1$^{7,10}$]-3-dodecene,
8-methyl-8-carboxy-tetracyclo[4.4.0.1$^{2,5}$.1$^{7,10}$]-3-dodecene,
8-ethyl-8-carboxy-tetracyclo[4.4.0.1$^{2,5}$.1$^{7,10}$]-3-dodecene,
8-methyl-8-hydroxymethyl-tetracyclo-[4.4.0.1$^{2,5}$.1$^{7,10}$]-3-dodecene,
8-ethyl-8-hydroxymethyl-tetracyclo-[4.4.0.1$^{2,5}$.1$^{7,10}$]-3-dodecene,
8-methyl-8-aminomethyl-tetracyclo-[4.4.0.1$^{2,5}$.1$^{7,10}$]-3-dodecene,
8-ethyl-8-aminomethyl-tetracyclo[4.4.0.1$^{2,5}$.1$^{7,10}$]-3-dodecene,
8-methyl-8-aminocarbonyl-tetracyclo-[4.4.0.1$^{2,5}$.1$^{7,10}$]-3-dodecene,
8-methyl-8-N-methyl-aminocarbonyl-tetracyclo-[4,4.0.1$^{2,5}$.1$^{7,10}$]-3-dodecene,
8-ethyl-8-aminocarbonyl-tetracyclo-[4.4.0.1$^{2,5}$.1$^{7,10}$]-3-dodecene, and
8-ethyl-8-N-ethyl-aminocarbonyl-tetracyclo-[4.4.0.1$^{2,5}$.1$^{7,10}$]-3-dodecene.

The structural unit (c) is preferably contained in a range of 0.01 to 30 mol %, more preferably 0.05 to 10 mol %, particularly preferably 0.1 to 5 mol % based on the whole structural unit.

When the proportion of the structural unit (c) contained is 0.01 mol % or higher, an elastomer obtained from the resulting copolymer tends to have good adhesion to and compatibility with metals, and other elastomers and resins than polyolefin. When the proportion of the structural unit (c) is 30 mol % or lower on the other hand, the copolymerization of the specific functional group-containing cycloolefin with other monomers is successfully conducted, and the resulting copolymer tends to have rubber elasticity as an elastomer. In addition, as the result that the amount of a polymerization catalyst used may become less, a high-molecular weight copolymer is easy to be provided.

The structural unit (d) is a structural unit derived from a nonconjugated diene and contained in the copolymer as needed.

As specific examples of the nonconjugated diene used for forming the structural unit (d), may be mentioned:

linear acyclic dienes such as 1,4-hexadiene, 1,6-octadiene and 1,5-hexadiene, branched-chain acyclic dienes such as 5-methyl-1,4-hexadiene, 3,7-dimethyl-1,6-octadiene, 5,7-dimethyl-1,6-octadiene, 3,7-dimethyl-1,7-octadiene, 7-methyl-1,6-octadiene and dihydromyrcene, and alicyclic dienes such as tetrahydroindene, methyl-tetrahydroindene, dicyclopentadiene, bicyclo[2.2.1]-hept-2,5-diene, 5-methylene-2-norbornene, 5-ethylidene-2-norbornene, 5-propenyl-2-norbornene, 5-isopropylidene-2-norbornene, 5-cyclohexylidene-2-norbornene and 5-vinyl-2-norbornene. Those compounds may be used either singly or in any combination thereof.

Of the above-mentioned nonconjugated dienes, are preferred 1,4-hexadiene, 5-methylene-2-norbornene and 5-ethylidene-2-norbornene.

The structural unit (d) is preferably contained in a range of 0 to 12 mol %, more preferably 0 to 8 mol %, particularly preferably 0 to 5 mol % based on the whole structural unit. When the proportion of the structural unit (d) contained is 12 mol % or lower, an elastomer obtained from the resulting copolymer tends to have good durability.

The functional group-containing olefin copolymers according to the present invention have an intrinsic viscosity [η] ranging from 0.1 to 10 dl/g, preferably from 0.1 to 7 dl/g, particularly preferably from 0.1 to 5 dl/g as measured in decalin at 135° C.

When the intrinsic viscosity [η] is 0.1 dl/g or higher, such a copolymer tends to provide an elastomer having rubber elasticity by vulcanizing or crosslinking it. When the intrinsic viscosity [η] is 10 dl/g or lower, such a copolymer tends to have good molding and processing ability.

The functional group-containing olefin copolymers according to the present invention preferably have an weight average molecular weight Mw of 1,000 to 3,000,000, more preferably 3,000 to 1,000,000, particularly preferably 5,000 to 700,000 in terms of polystyrene as measured at 135° C. by gel permeation chromatography making use of o-dichlorobenzene as a solvent, and have a number average molecular weight Mn of 500 to 1,000,000, more preferably 1,000 to 500,000, particularly preferably 2,000 to 300,000 in terms of polystyrene.

In the functional group-containing olefin copolymers according to the present invention, the glass transition temperature is preferably −90 to 50° C., more preferably −70 to 10° C. Such a copolymer can provide an elastomer having sufficient elasticity.

The glass transition temperature of the functional group-containing olefin copolymer can be measured by means of a differential scanning calorimeter (DSC).

According to the functional group-containing olefin copolymers according to the present invention, the structural unit (c) has the specific functional group ($X^1$ and/or $X^2$), and so elastomers having high adhesion to metals, high adhesion and compatibility with other elastomers and resins than polyolefins and excellent coating property and printability are provided.

Since no hydrogen atom is bonded to the carbon atom to which the specific functional group ($X^1$ and/or $X^2$) is bonded in the structural unit (c), and so no tertiary hydrogen atom being apt to separate from the bonded carbon atom to produce a radical is present, scission of a molecular chain, oxidation and separation of a substituent group containing the functional group due to the formation of the radical are prevented. As a result, no or little deterioration is caused, and excellent durability is achieved.

Further, since an aliphatic hydrocarbon group is bonded to the carbon atom to which the specific functional group ($X^1$ and/or X²) is bonded in the structural unit (c), the specific functional group-containing cycloolefin used as a monomer gives off no or little odor even when the specific functional group is a carboxyl group. Therefore, the resulting copolymer gives off no or little odor.

Since the functional group-containing olefin copolymers according to the present invention have such properties as described above, they can provide elastomers suitable for use as materials for automotive parts, mechanical parts, construction materials, etc.

Since the functional group-containing olefin copolymers according to the present invention have high compatibility with other polymers, elastomers having good co-crosslinking ability can be provided when they are mixed with other elastomer materials, for example, nitrile rubber, chloroprene rubber, chlorinated polyethylene rubber, halogenated butyl rubber, acrylic rubber, ethylene-acrylic copolymer rubber, hydrogenated nitrile rubber, etc. to conduct crosslinking.

In addition, the functional group-containing olefin copolymers according to the present invention can be used as modifiers for polypropylene, polyethylene, hydrogenated styrene/butadiene random copolymers, hydrogenated styrene/butadiene block copolymers, hydrogenated styrene/isoprene block copolymers, etc. Such materials are suitable for use as automotive exterior or interior materials such as various films, bumpers, instrument panels and door trims.

According to the functional group-containing olefin copolymers according to the present invention, their graft copolymers with polyester such as polybutylene terephthalate, polyethylene terephthalate; polyamide and polyurethane can be obtained by using the functional group in the structural unit (c) as a starting point, whereby resins improved in impact resistance, thermoplastic elastomer having high heat resistance, etc. can be provided.

Such functional group-containing olefin copolymers can be produced in the following manner.

The specific functional group-containing cycloolefin is first reacted with an organometallic compound (hereinafter referred to as "the specific organometallic compound") comprising a metal selected from metals of Groups 2, 12 and 13 of the periodic table, whereby the functional group (group X¹ and/or group X²) in the specific functional group-containing cycloolefin is subjected to a masking treatment.

Specific examples of the specific organometallic compound used in the masking treatment include diethylzinc, dibutylmagnesium, ethylmagnesium chloride, butylmagnesium chloride, trimethylaluminum, triethylaluminum, triisobutylaluminum, trihexylaluminum, diisobutylaluminum hydride, diethylaluminum hydride, ethylaluminum dihydride, diethylaluminum ethoxide, ethylaluminum diethoxide, dibutylaluminum ethoxide, dibutylaluminum butoxide, diisobutylaluminum dibutoxide, diisobutylaluminum isopropoxide, diisobutylaluminum 2-ethylhexyloxide, isobutylaluminum butoxide, isobutylaluminum 2-ethylhexyloxide, diethylaluminum chloride, ethylaluminum dichloride, diethylaluminum bromide, ethylaluminum sesquichloride, and methylalumoxane, ethylalumoxane and butylalumoxane obtained by the reaction of water or copper sulfate hydrate with a trialkylaluminum.

Of these, the organoaluminum compounds are preferred. Examples of particularly preferred organoaluminum compounds include trimethylaluminum, triethylaluminum, truisobutylaluminum, diisobutylaluminum hydride, diethylaluminum chloride and ethylaluminum sesquichloride.

The masking treatment, i.e., the reaction of the specific functional group-containing cycloolefin with the specific organometallic compound is preferably conducted in the presence of an inert solvent or diluent under an atmosphere of an inert gas such as nitrogen gas, argon gas or helium gas.

As the inert solvent or diluent, may be used aliphatic hydrocarbons such as butane, pentane, hexane, heptane and octane, cyclic hydrocarbons such as cyclopentane, cyclohexane and methylcyclopentane, and aromatic compounds and halogenated hydrocarbons such as benzene, toluene, xylene, chlorobenzene, dichloroethane and dichloromethane.

The specific organometallic compound is preferably used in a proportion of at least 0.8 equivalents, more preferably 0.9 to 1.5 equivalents per equivalent of the functional group in the specific functional group-containing cycloolefin. If this proportion is too low, a great amount of the functional group remains unmasked, and so the catalytic activity in a polymerization treatment, which will be described subsequently, may be lowered in some cases, and the polymerization reaction may not proceed sufficiently.

The conditions for the reaction of the specific functional group-containing cycloolefin with the specific organometallic compound vary according to the kinds of the specific organometallic compound and specific functional group-containing cycloolefin used. However, the reaction time is generally 2 minutes to 10 hours, preferably 10 minutes to 2 hours, and the reaction temperature is generally −10 to 60° C., preferably 10 to 40° C.

The specific functional group-containing cycloolefin subjected to the masking treatment in such a manner is preferably stored at a temperature of 30° C. or lower until it is subjected to a polymerization treatment. The occurrence of side reactions during the storing can be prevented thereby.

When an unreacted metal-carbon bond is present in the masked compound, a compound having a branched structure, for example, an alcohol such as isopropanol, sec-butanol, tert-butanol or 2-ethylhexanol, or a phenol such as 2,6-di-tert-butylcresol, 2,6-di-tert-butylphenol, 2,6-dimethylcresol or 2,6-dimethylphenol, may also be added.

In the production process according to the present invention, the specific functional group-containing cycloolefin subjected to the masking treatment, ethylene, the specific α-olefin and a nonconjugated diene optionally used are subjected to a polymerization treatment.

In the polymerization treatment of these monomers, a catalyst composed of a transition metal compound, preferably a compound of a metal selected from metals of Groups 4 and 5 of the periodic table, and an organoaluminum compound is used.

As the catalyst, a catalyst capable of providing a copolymer, in which the respective structural units are arranged at comparatively random manner in the copdymerization of ethylene α-olefin and non-conjugated diene is preferably used. Specific examples of the catalyst system include the following systems.

(1) A catalyst system composed of a hydrocarbon compound-soluble vanadium compound and an organoaluminum compound, in which at least one chlorine atom is contained in any one of the vanadium compound and the organoaluminum compound, or both compounds.

In this catalyst system, as the vanadium compound, may be used a compound represented by the following general formula (3), $VCl_4$, $VO(acac)_2$, $V(acac)_3$ (in which "acac" means an acetylacetonato group), or a compound represented by the following general formula (4).

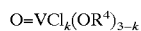   General formula (3):

wherein $R^4$ means a hydrocarbon group such as an ethyl, propyl, butyl or hexyl group, and k denotes an integer of 0 to 3.

| | |
|---|---|
| VCl$_3$·mZ | General formula (4): | wherein Z means a Lewis base forming a complex soluble in hydrocarbon compounds, such as tetrahydrofuran, 2-methyl-tetrahydrofuran, 2-methoxymethyl-tetrahydrofuran or dimethylpyridine, and m denotes an integer of 2 or 3.

As the organoaluminum compound, may be used a trialkylaluminum compound represented by the following general formula (5), an alkylaluminum hydride represented by the following general formula (6) or (7), an alkylaluminum chloride represented by the following general formula (8), (9) or (10), an alkoxy- or phenoxy-substituted organoaluminum compound represented by the following general formula (11) or (12), or methylalumoxane (MAO), ethylalumoxane or butylalumoxane obtained by the reaction of water with the above-described trialkylaluminum compound.

| | |
|---|---|
| AlR$^5_3$ | General formula (5): |
| HAlR$^5_2$ | General formula (6): |
| H$_2$AlR$^5$ | General formula (7): |
| R$^5$AlCl$_2$ | General formula (8): |
| R$^5_3$Al$_2$Cl$_3$ | General formula (9): |
| R$^5_2$AlCl | General formula (10): |
| R$^5_2$Al(OR$^6$) | General formula (11): |
| R$^5$Al(OR$^6$)$_2$ | General formula (12): |

In the general formulae (5) to (12), R$^5$ means a hydrocarbon group such as a methyl, ethyl, propyl, butyl or hexyl group, and R$^6$ denotes a methyl, ethyl, butyl, phenyl, tolylxylyl, 2,6-di-tert-butylphenyl, 4-methyl-2,6-di-tert-butylphenyl, 2,6-dimethylphenyl or 4-methyl-2,6-dimethylphenyl group.

In this catalyst system, an oxygen- or nitrogen-containing electron donor such as an ester of an organic acid or inorganic acid, ether, amine, ketone or alkoxysilane may be additionally added to the vanadium compound and organoaluminum compound.

(2) A catalyst system composed of a titanium halide or zirconium halide carried on silica or magnesium chloride, and an organoaluminum compound.

In this catalyst system, as the titanium halide or zirconium halide, may be used titanium tetrachloride, titanium tetrabromide, zirconium tetrachloride or the like.

As the organoaluminum compound, may be used trimethylaluminum, triethylaluminum, triisobutylaluminum, methylalumoxane or the like.

In this catalyst system, dioctyl phthalate, tetraalkoxysilane, diphenyldimethoxysilane or the like may be additionally added to the above-described compounds.

(3) A catalyst system composed of a transition metal compound comprising a metal selected from titanium, zirconium and hafnium, which has one or two cyclopentadienyl or indenyl groups each having a substituent selected from hydrogen, alkyl groups and allyl group, and an organoaluminum compound containing at least 50 mol % of methylalumoxane.

Specific examples of the transition metal compound include bis(cyclopentadienyl)dimethylzirconium, bis(cyclopentadienyl)diethylzirconium, bis(cyclo-pentadienyl) methylzirconium monochloride, ethylenebis-(cyclopentadienyl)zirconium dichloride, ethylenebis-(cyclopentadienyl)methylzirconium monochloride, methylenebis(cyclopentadienyl)zirconium dichloride, ethylenebis(indenyl)zirconium dichloride, ethylenebis-(indenyl)dimethylzirconium, ethylenebis(indenyl)-diphenylzirconium, ethylenebis(4,5,6,7-tetrahydro-1-indenyl)dimethylzirconium, ethylenebis(4-methyl-1-indenyl)zirconium dichloride, ethylenebis(2,3-dimethyl-1-indenyl)zirconium dichloride, dimethylsilylbis-(cyclopentadienyl)zirconium dichloride, dimethylsilyl-bis (indenyl)zirconium dichloride, dimethylsilylbis-(dimethylcyclopentadienyl)zirconium dichloride, dimethylmethyl(fluorenyl)(cyclopentadienyl)zirconium dichloride, diphenylmethyl(fluorenyl)(cyclopentadienyl)-zirconium dichloride, diphenylsilylbis(indenyl)zirconium dichloride, dimethylsilylbis(2-methyl-4-phenylindenyl)-zirconium dichioride, bis(cyclopentadienyl)dimethyl-titanium, bis(cyclopentadienyl)methyltitanium monochloride, ethylenebis(indenyl)titanium dichloride, ethylenebis(4,5,6,7-tetrahydro-1-indenyl)titanium dichloride, methylenebis(cyclopentadienyl)titanium dichloride, η$^1$:η$^5$-{[(tert-butyl-amido)dimethylsilyl]-(2,3,4, 5-tetramethyl-1-cyclopentadienyl)}titanium dichloride and bis(1,1,1-trifluoro-3-phenyl-2,4-butadionato) titanium dichioride.

(4) A metallocene catalyst system composed of dichloride of a bisalkyl-substituted or N-alkyl-substituted salicylaldoimine and titanium, zirconium or hafnium, and methylalumoxane (MAO).

The polymerization treatment of the monomers is preferably conducted in the presence of a proper solvent or diluent. As such a solvent or diluent, may be used, for example, an aliphatic hydrocarbon, alicyclic hydrocarbon, aromatic hydrocarbon or halide thereof. Specific examples thereof include butane, pentane, hexane, heptane, 2-butene, 2-methyl-2-butene cyclopentane, methylcyclopentane, cyclohexane, isooctane, benzene, toluene, xylene, chlorobenzene, dichloromethane and dichloroethane. These solvents or diluents may preferably be used in a state that the water content has been lowered to 20 ppm or lower by a distilling treatment or adsorbing treatment.

The polymerization reaction is preferably conducted at a temperature of 0 to 150° C., particularly 10 to 100° C.

In the polymerization reaction, a molecular weight modifier may be used as needed. Specific examples thereof include hydrogen, diethylzinc and diisobutylaluminum hydride.

A reactor used for conducting the polymerization reaction may be any of the batch type and the continuous type. As the continuous type reactor, may be used a tube type reactor, tower type reactor or vessel type reactor.

In the present invention, the polymerization treatment of the monomers is conducted in the above-described manner, and the resultant copolymer is then subjected to a demasking treatment, whereby the intended functional group-containing olefin copolymer is obtained.

When a compound, in which the specific functional group (group X$^1$ and/or group X$^2$) is a hydroxyl or carboxyl group, is used as the specific functional group-containing cycloolefin, the demasking treatment is conducted by using an acid having a comparatively high acidity, such as formic acid, oxalic acid, fumaric acid, lactic acid, dioctylmonophosphoric acid, trifluoroacetic acid, dodecylbenzenesulfonic acid, nonylphenoxypolyethylene glycol monophosphate, nonylphenoxypolyethylene glycol diphosphate, lauroxypolyethylene glycol monophosphate or lauroxypolyethylene glycol diphosphate.

When a compound, in which the specific functional group (group X$^1$ and/or group X$^2$) is an amino or amide group, is used as the specific functional group-containing cycloolefin on the other hand, the demasking treatment is conducted by using an alcoholate having a strong basicity, such as an alcoholate of tert-butanol with lithium, sodium or potassium, an alcoholate of amyl alcohol with lithium, sodium or potassium, the lithium, sodium or potassium salt of octanoic acid, or the lithium or potassium salt of nonylphenol, phenol or an alkali metal salt of an organic carboxylic acid.

In the production process according to the present invention, a treatment for removing remaining demasking agent, polymerization catalyst and the like is preferably conducted by passing the thus-obtained polymer solution containing the functional group-containing olefin copolymer through an adsorption column in which silica, alumina, diatomaceous earth has been packed, or adding a great amount of water, alcohol or the like to the polymer solution to wash it.

A publicly known phenolic, phosphorus-containing or sulfur-containing antioxidant may be added to the polymer solution with a view toward improving the stability of the functional group-containing olefin copolymer.

Steam is blown into the polymer solution, thereby conducting a removal treatment of the solvent, and solids are then separated from the resulting slurry and dehydrated and dried by means of a screw type squeezer, extruder, heated roll or the like, thereby obtaining the functional group-containing olefin copolymer as a solid. Alternatively, the polymer solution is heated to concentrate it, and the concentrate is dried by means of a vented extruder, thereby obtaining the functional group-containing olefin copolymer as a solid.

According to the process described above, the functional group in the specific functional group-containing cycloolefin is subjected to the masking treatment with the specific organometallic compound. Therefore, masking of such a functional group is assured, and consequently the activity of the catalyst is prevented from being lowered in the polymerization reaction, and no obstruction to the polymerization reaction is offered. As a result, the intended functional group-containing olefin copolymer can be exactly produced.

The rubber composition according to the present invention comprises a component (A) composed of the functional group-containing olefin copolymer as described above, and a component (B) composed of a vulcanizing agent and/or a crosslinking agent and further contains a component (C) composed of an olefin copolymer having no functional group as needed.

No particular limitation is imposed on the vulcanizing agent as the component (B) used in the rubber composition according to the present invention, and specific examples thereof include sulfur such as sulfur powder, precipitated sulfur, colloidal sulfur and insoluble sulfur; inorganic vulcanizing agents such as sulfur chloride, selenium and tellurium; and sulfur-containing organic compounds such as morpholine disulfide, alkylphenol disulfides, thiuram disulfides and dithiocarbamates. These vulcanizing agents may be used either singly or in any combination thereof.

The proportion of the vulcanizing agent used is generally 0.1 to 10 parts by weight, preferably 0.5 to 5 parts by weight per 100 parts by weight of the component (A).

In the rubber composition according to the present invention, a vulcanization accelerator may be used in combination with the vulcanizing agent.

Specific examples of such a vulcanization accelerator include aldehyde ammonia type vulcanization accelerators such as hexamethylenetetramine; guanidine type vulcanization accelerators such as diphenyl-guanidine, di-(o-tolyl) guanidine and o-tolylbiguanidine; thiourea type vulcanization accelerators such as thiocarboanilide, di-(o-tolyl) thiourea, N,N'-diethyl-thiourea, tetramethylthiourea, trimethylthiourea and dilaurylthiourea; thiazole type vulcanization accelerators such as mercaptobenzothiazole, dibenzothiazyl disulfide, 2-(4-morpholinothio)benzothiazole, 2-(2,4-dinitrophenyl)-mercaptobenzothiazole and (N,N'-diethylthiocarbamoylthio)benzothiazole; sulfenamide type vulcanization accelerators such as N-t-butyl-2-benzothiazyl sulfenamide, N,N'-dicyclohexyl-2-benzothiazyl sulfenamide, N,N'-diisopropyl-2-benzothiazyl sulfenamide and N-cyclohexyl-2-benzothiazyl sulfenamide; thiuram type vulcanization accelerators such as tetramethylthiuram disulfide, tetraethylthiuram disulfide, tetra-n-butylthiuram disulfide, tetramethylthiuram monosulfide and dipentamethylenethiuram tetrasulfide; carbamate type vulcanization accelerators such as zinc dimethylthiocarbamate, zinc diethylthiocarbamate, zinc di-n-butylthiocarbamate, zinc ethylphenylthiocarbamate, sodium dimethyldithiocarbamate, copper dimethyldithiocarbamate, tellurium dimethylthiocarbamate and iron dimethylthiocarbamate; and xanthogenate type vulcanization accelerators such as zinc butylthioxanthogenate. These vulcanization accelerators may be used either singly or in any combination thereof.

The proportion of the vulcanization accelerator used is generally 0.1 to 20 parts by weight, preferably 0.2 to 10 parts by weight per 100 parts by weight of the component (A).

To the rubber composition according to the present invention, may be added a vulcanization acceleration aid, as needed, in addition to the vulcanizing agent and vulcanization accelerator.

As specific examples of such a vulcanization acceleration aid, may be mentioned metal oxides such as magnesium oxide, zinc white, litharge, red lead and lead white; and organic acids or organic acid salts such as stearic acid, oleic acid and zinc stearate. Of these, zinc white and stearic acid one preferred. These vulcanization acceleration aids may be used either singly or in any combination thereof.

The proportion of the vulcanization acceleration aid used is generally 0.5 to 20 parts by weight per 100 parts by weight of the component (A).

No particular limitation is imposed on the crosslinking agent as the component (B) used in the rubber composition according to the present invention, and specific examples thereof include organic peroxides such as 1,1-di-tert-butylperoxy-3,3,5-trimethyl-cyclohexane, di-tert-butyl peroxide, dicumyl peroxide, tert-butylcumyl peroxide, 2,5-dimethyl-2,5-di(tert-butylperoxy)hexane and 1,3-bis(tert-butylperoxy-isopropyl)benzene. These crosslinking agents may be used either singly or in any combination thereof.

The proportion of the crosslinking agent used is generally 0.1 to 15 parts by weight, preferably 0.5 to 10 parts by weight per 100 parts by weight of the component (A).

In the rubber composition according to the present invention, a crosslinking aid may also be used in combination with the crosslinking agent.

Specific examples of such a crosslinking aid include sulfur and sulfur compounds such as sulfur and dipentamethylenethiuram tetrasulfide; polyfunctional monomers such as ethylene diacrylate, ethylene dimethacrylate, polyethylene diacrylate, polyethylene dimethacrylate, divinylbenzene, diallyl phthalate, triallyl cyanurate, m-phenylene bismaleimide and toluylene bismaleimide; and oxime compounds such as p-quinone oxime and p,p'-dibenzoylquinone oxime. These crosslinking aids may be used either singly or in any combination thereof.

The proportion of the crosslinking aid used is generally 0.5 to 20 parts by weight per 100 parts by weight of the component (A).

In the rubber composition according to the present invention, the component (C) is an olefin copolymer having no functional group and contained as needed.

No particular limitation is imposed on such an olefin copolymer having no functional group so far as it is commonly used in rubber compositions. It is however preferable to use a copolymer comprising a structural unit derived from ethylene and a structural unit derived from an α-olefin having 3 to 12 carbon atoms, or a copolymer comprising a structural unit derived from ethylene, a structural unit derived from an α-olefin having 3 to 12 carbon atoms and a structural unit derived from a nonconjugated diene.

As specific examples of the α-olefin having 3 to 12 carbon atoms, may be mentioned those mentioned as examples of the specific α-olefin for forming the structural unit (b) in the functional group-containing olefin copolymer which is the component (A).

As specific examples of the nonconjugated diene, may be mentioned those mentioned as examples of the nonconjugated diene for forming the structural unit (d) in the functional group-containing olefin copolymer which is the component (A).

The olefin copolymer having no functional group, which is the component (C), preferably has an weight average molecular weight Mw of 1,000 to 3,000,000, more preferably 3,000 to 2,500,000, particularly preferably 5,000 to 2,000,000 in terms of polystyrene as measured at 135° C. by gel permeation chromatography making use of o-dichlorobenzene as a solvent, and has a number average molecular weight Mn of 500 to 1,000,000, more preferably 1,500 to 800,000, particularly preferably 2,500 to 600,000 in terms of polystyrene.

When the component (C) is contained in the rubber composition according to the present invention, a ratio of the component (A) to the component (C) is preferably 1:99 to 99:1, more preferably 1:99 to 50:50, still more preferably 3:97 to 30:70 in terms of a weight ratio.

In the rubber composition according to the present invention, may be contained a filler or softening agent.

As specific examples of the filler, may be mentioned carbon black such as SRF (semi-reinforcing furnace), FEF (fast extrusion furnace), HAF (high abrasion furnace), ISAF (intermediate super abrasion furnace), SAF (super abrasion furnace), FT (fine thermal) and MT (medium thermal); and inorganic fillers such as white carbon, finely particulate magnesium silicate, calcium carbonate, magnesium carbonate, clay and talc. These fillers may be used either singly or in any combination thereof.

The proportion of the filler used is generally 10 to 200 parts by weight, preferably 10 to 100 parts by weight per 100 parts by weight of the component (A).

As specific examples of the softening agent, may be mentioned process oils such as aromatic oil, naphthenic oil and paraffin oil commonly used as compounding additives for rubber, vegetable oils such as coconut oil, and synthetic oils such as alkylbenzene oil. Of these, the process oils are preferred, with paraffin oil being particularly preferred. These softening agents may be used either singly or in any combination thereof.

The proportion of the softening agent used is generally 10 to 130 parts by weight, preferably 20 to 100 parts by weight per 100 parts by weight of the component (A).

Since the rubber compositions according to the present invention contain the functional group-containing olefin copolymer as the component (A), they permit providing elastomers which are high in adhesion to and compatibility with other materials, coating property and printability and excellent in durability, mechanical properties and abrasion resistance, and give off no or little odor.

The present invention will hereinafter be described specifically by the following examples. However, the present invention is not limited by these examples.

EXAMPLE 1

A 2-L separable flask purged with nitrogen was charged with 960 mL of hexane and 5 mL of a 0.5 mol/L hexane solution (containing 2.5 mmol of 5-methyl-5-carboxy-bicyclo[2.2.1]-2-heptene) of 5-methyl-5-carboxy-bicyclo[2.2.1]-2-heptene. While stirring the resultant mixture, 2.5 mmol of $Al_2(C_2H_5)_3Cl_3$ were then added to conduct a reaction, thereby masking the carboxyl group in 5-methyl-5-carboxy-bicyclo[2.2.1]-2-heptene.

While continuously feeding a gaseous mixture of ethylene (feed rate: 5 L/min)/propylene (feed rate: 5 L/min)/hydrogen (feed rate: 0.5 L/min) to the resultant solution, 1.85 mL (containing 1.5 mmol of $Al_2(C_2H_5)_3Cl_3$) of a hexane solution containing $Al_2(C_2H_5)_3Cl_3$ at a concentration of 0.81 mol/L were then added as a catalyst, and 1.5 mL (containing 0.15 mmol of $VCl_4$) of a hexane solution containing $VCl_4$ at a concentration of 0.10 mol/L were added to conduct a copolymerization reaction of ethylene, propylene and 5-methyl-5-carboxy-bicyclo[2.2.1]-2-heptene at 20° C. for 20 minutes.

A methanol solution containing 40 mmol of oxalic acid was added to the resultant polymer solution, and the mixture was stirred for 10 minutes, thereby conducting a demasking treatment.

After 1 L of water was then added to the polymer solution, and the mixture was stirred for 10 minutes, only the polymer solution (organic layer) was recovered. The polymer solution was washed 3 times with 1 L of water, thereby conducting a removal treatment of remaining oxalic acid and the like. Thereafter, steam was blown into the polymer solution, thereby conducting a removal treatment of the solvent, and solids were then separated from the resultant slurry and dried by means of a heated roll, thereby obtaining 16.5 g of a functional group-containing olefin copolymer as a solid. No odor was observed in the functional group-containing olefin copolymer thus obtained.

The functional group-containing olefin copolymer was analyzed. As a result, it was found that the content of the structural unit derived from ethylene was 56.1 mol %, the content of the structural unit derived from propylene was 43.7 mol %, and the content of the structural unit derived from 5-methyl-5-carboxy-bicyclo-[2.2.1]-2-heptene was 0.2 mol %.

The intrinsic viscosity [η] was found to be 1.7 dl/g as measured in decalin at 135° C., and the weight average molecular weight Mw be $19.6 \times 10^4$ in terms of polystyrene as measured by gel permeation chromatography and number average molecular weight Mn be $7.0 \times 10^4$ in terms of polystyrene.

The glass transition temperature was −57.5° C. as measured by means of a differential scanning calorimeter (DSC).

The thus-obtained functional group-containing olefin copolymer was subjected to a pressing treatment at 160° C. for 10 minutes by an electric heat press and then analyzed. As a result, the content of the structural unit derived from 5-methyl-5-carboxy-bicyclo-[2.2.1]-2-heptene was found to be 0.2 mol %. This value was the same as the value before the pressing treatment. It was hence confirmed that the copolymer has excellent durability.

The functional group-containing olefin copolymer was subjected to a 90-degree peeling test to a polyester film in accordance with the testing method for peeling prescribed in JIS Z 0237. As a result, the peel strength was found to be 0.8 newton/2.5 cm.

EXAMPLE 2

A functional group-containing olefin copolymer was obtained in an amount of 15.0 g in the same manner as in Example 1 except that Al(iso-$C_4H_9$)$_3$ was used in place of Al$_2$ ($C_2H_5$)$_3$Cl$_3$ in the masking treatment of 5-methyl-5-carboxy-bicyclo [2.2.1]-2-heptene.

The functional group-containing olefin copolymer thus obtained was analyzed. As a result, it was found that the content of the structural unit derived from ethylene was 70.0 mol %, the content of the structural unit derived from propylene was 29.7 mol %, and the content of the structural unit derived from 5-methyl-5-carboxy-bicyclo[2.2.1]-2-heptene was 0.3 mol %.

The intrinsic viscosity [η] was found to be 1.9 dl/g as measured in decalin at 135° C., and the weight average molecular weight Mw be 170,000 in terms of polystyrene as measured by gel permeation chromatography and number average molecular weight Mn be 75,000 in terms of polystyrene.

The glass transition temperature was −52.0° C. as measured by means of a differential scanning calorimeter (DSC).

The thus-obtained functional group-containing olefin copolymer was subjected to a pressing treatment at 160° C. for 10 minutes by an electric heat press and then analyzed. As a result, the content of the structural unit derived from 5-methyl-5-carboxy-bicyclo-[2.2.1]-2-heptene was found to be 0.3 mol %. This value was the same as the value before the pressing treatment. It was hence confirmed that the copolymer has excellent durability.

The functional group-containing olefin copolymer was subjected to a 90-degree peeling test to a polyester film in accordance with the testing method for peeling prescribed in JIS Z 0237. As a result, the peel strength was found to be 1.0 newton/2.5 cm.

EXAMPLE 3

A functional group-containing olefin copolymer was obtained in an amount of 16.7 g in the same manner as in Example 1 except that the amounts of 5-methyl-5-carboxy-bicyclo[2.2.1]-2-heptene and Al$_2$($C_2H_5$)$_3$Cl$_3$ used in the masking treatment were changed from 2.5 mmol to 10.0 mmol and from 2.5 mmol to 10.0 mmol, respectively, and VOCl$_3$ was used in place of VCl$_4$ as the polymerization catalyst.

The functional group-containing olefin copolymer thus obtained was analyzed. As a result, it was found that the content of the structural unit derived from ethylene was 56.8 mol %, the content of the structural unit derived from propylene was 42.4 mol %, and the content of the structural unit derived from 5-methyl-5-carboxy-bicyclo[2.2.1]-2-heptene was 0.8 mol %.

The intrinsic viscosity [η] was found to be 1.2 dl/g as measured in decalin at 135° C., and the weight average molecular weight Mw be 250,000 in terms of polystyrene as measured by gel permeation chromatography and number average molecular weight Mn be 100,000 in terms of polystyrene.

The glass transition temperature was −53.3° C. as measured by means of a differential scanning calorimeter (DSC).

The thus-obtained functional group-containing olefin copolymer was subjected to a pressing treatment at 160° C. for 10 minutes by an electric heat press and then analyzed. As a result, the content of the structural unit derived from 5-methyl-5-carboxy-bicyclo-[2.2.1]-2-heptene was found to be 0.8 mol %. This value was the same as the value before the pressing treatment. It was hence confirmed that the copolymer has excellent durability.

The functional group-containing olefin copolymer was subjected to a 90-degree peeling test to a polyester film in accordance with the testing method for peeling prescribed in JIS Z 0237. As a result, the peel strength was found to be 0.8 newton/2.5 cm.

Comparative Example 1

A functional group-containing olefin copolymer was obtained in an amount of 16.5 g in the same manner as in Example 1 except that 5-carboxy-bicyclo[2.2.1]-2-heptene was used in place of 5-methyl-5-carboxy-bicyclo[2.2.1]-2-heptene. A strong odor was observed in the functional group-containing olefin copolymer thus obtained.

The functional group-containing olefin copolymer was analyzed. As a result, it was found that the content of the structural unit derived from ethylene was 56.8 mol %, the content of the structural unit derived from propylene was 43.0 mol %, and the content of the structural unit derived from 5-carboxy-bicyclo[2.2.1]-2-heptene was 0.2 mol %.

The intrinsic viscosity [η] was found to be 1.8 dl/g as measured in decalin at 135° C., and the weight average molecular weight Mw be $20.1 \times 10^4$ in terms of polystyrene as measured by gel permeation chromatography and number average molecular weight Mn be $7.2 \times 10^4$ in terms of polystyrene.

The glass transition temperature was −57.0° C. as measured by means of a differential scanning calorimeter (DSC).

The thus-obtained functional group-containing olefin copolymer was subjected to a pressing treatment at 160° C. for 10 minutes by an electric heat press and then analyzed. As a result, the content of the structural unit derived from 5-carboxy-bicyclo[2.2.1]-2-heptene was found to be 0.1 mol %. The content was extremely lowered compared with the value before the pressing treatment. It was hence confirmed that the copolymer has poor durability.

Comparative Example 2

A functional group-containing olefin copolymer was produced in the same manner as in Example 1 except that a methyl ester of 5-carboxy-bicyclo[2.2.1]-2-heptene was used in place of 5-methyl-5-carboxy-bicyclo[2.2.1]-2-heptene, and neither masking treatment nor demasking treatment was conducted. As a result, the yield was 2.0 g. It was hence confirmed that the polymerization reaction is not allowed to sufficiently proceed.

Comparative Example 3

It was attempted to produce a functional group-containing olefin copolymer in the same manner as in Example 1 except that a tert-butyl ester of 5-carboxy-bicyclo[2.2.1]-2-heptene was used in place of 5-methyl-5-carboxy-bicyclo[2.2.1]-2-heptene, and neither masking treatment nor demasking treatment was conducted. However, no olefin copolymer was obtained at all. It was hence confirmed that the polymerization reaction is not allowed to proceed.

Comparative Example 4

An olefin copolymer was produced in the same manner as in Example 1 except that neither 5-methyl-5-carboxybicyclo[2.2.1]-2-heptene nor the masking agent was used.

The olefin copolymer thus obtained was analyzed. As a result, it was found that the content of the structural unit derived from ethylene was 56.8 mol %, and the content of the structural unit derived from propylene was 43.2 mol %.

The intrinsic viscosity [η] was found to be 1.75 dl/g as measured in decalin at 135° C., and the glass transition temperature was −58.9° C. as measured by means of a differential scanning calorimeter (DSC).

The olefin copolymer was subjected to a 90-degree peeling test to a polyester film in accordance with the testing method for peeling prescribed in JIS Z 0237. As a result, the peel strength was found to be 0.1 newton/2.5 cm, and so the adhesion was extremely low compared with the olefin copolymers according to Examples 1 to 3.

EXAMPLE 4

A 3-L separable flask purged with nitrogen was charged with 2,000 mL of hexane and 70 mL of a 0.5 mol/L hexane solution (containing 35 mmol of 5-methyl-5-carboxybicyclo[2.2.1]-2-heptene) of 5-methyl-5-carboxybicyclo[2.2.1]-2-heptene. While stirring the resultant mixture, 42 mmol of Al(iso-$C_4H_9$)$_3$ were then added to conduct a reaction, thereby masking the carboxyl group in 5-methyl-5-carboxy-bicyclo[2.2.1]-2-heptene.

To the resultant solution, were added 2 ml of 5-ethylidene-2-norbornene. While continuously feeding a gaseous mixture of ethylene (feed rate: 5 L/min)/propylene (feed rate: 5 L/min)/hydrogen (feed rate: 0.5 L/min) to the solution, 104 mL (containing 84 mmol of $Al_2(C_2H_5)_3Cl_3$) of a 0.81 mol/L hexane solution of $Al_2(C_2H_5)_3Cl_3$ were then added as a catalyst, and 24 mL (containing 2.4 mmol of $VCl_4$) of a 0.10 mol/L hexane solution of $VCl_4$ were added to conduct a copolymerization reaction of ethylene, propylene, 5-methyl-5-carboxy-bicyclo[2.2.1]-2-heptene and 5-ethylidene-2-norbornene at 25° C. for 10 minutes.

A butanol solution containing 630 mmol of lactic acid was added to the resultant copolymer solution, and the mixture was stirred for 10 minutes, thereby conducting a demasking treatment.

After 1 L of water was then added to the copolymer solution, and the mixture was stirred for 10 minutes, only the copolymer solution (organic layer) was recovered. The copolymer solution was washed 3 times with 1 L of water, thereby conducting a removal treatment of remaining lactic acid and the like. Thereafter, steam was blown into the copolymer solution, thereby conducting a removal treatment of the solvent, and solids were then separated from the resultant slurry and dried by means of a heated roll, thereby obtaining 30 g of a functional group-containing olefin copolymer as a solid. This functional group-containing olefin copolymer is referred to as "Copolymer (A1)". No odor was observed in Copolymer (A1).

Copolymer (A1) was analyzed. As a result, it was found that the content of the structural unit derived from ethylene was 64.7 mol %, the content of the structural unit derived from propylene was 33 mol %, the content of the structural unit derived from 5-methyl-5-carboxy-bicyclo[2.2.1]-2-heptene was 1.0 mol %, and the -content of the structural unit derived from 5-ethylidene-2-norbornene was 1.3 mol %.

The intrinsic viscosity [η] of Copolymer (A1) was found to be 1.77 dl/g as measured in decalin at 135° C., and the weight average molecular weight Mw be 18.7×$10^4$ in terms of polystyrene as measured by gel permeation chromatography and number average molecular weight Mn be 8.2×$10^4$ in terms of polystyrene.

The glass transition temperature was −47.4° C. as measured by means of a differential scanning calorimeter (DSC).

In a Laboplast mill having an internal volume of 250 mL, 100 parts by weight of Copolymer (A1), 50 parts by weight of carbon black (Seatos SO, trade name; product of Tokai Carbon Co., Ltd.), 1 part by weight of stearic acid and 10 parts by weight of process oil (Fukol 2050N, trade name; product of Fujikosan Co., Ltd.) were kneaded for 180 seconds under conditions of 60 rpm and 50° C.

To the kneaded product thus obtained, were added 5 parts by weight of zinc oxide, 1 part by weight of tetramethylthiuram disulfide and 5 parts by weight of mercaptobenzothiazole as a vulcanization accelerator, and 0.5 parts by weight of sulfur, and the resultant mixture was kneaded for 5 minutes by a 10-inch roll kept at 50° C., thereby obtaining a rubber composition.

EXAMPLES 5 TO 7

Functional group-containing olefin copolymers containing the respective structural units in their corresponding proportions shown in Table 1 were produced in the same manner as in Example 4 except that the amounts of 5-methyl-5-carboxy-bicyclo[2.2.1]-2-heptene and 5-ethylidene-2-norbornene used were changed, and the feed rates of ethylene and propylene were changed. The functional group-containing olefin copolymers thus obtained are referred to as "Copolymer (A2)", "Copolymer (A3)" and "Copolymer (A4)", respectively.

With respect to Copolymers (A2) to (A4) thus obtained, the intrinsic viscosities [η] as measured in decalin at 135° C., the weight average molecular weights Mw in terms of polystyrene as measured by gel permeation chromatography and number average molecular weights Mn in terms of polystyrene, and the glass transition temperatures as measured by means of a differential scanning calorimeter (DSC) are shown in Table 1.

Rubber compositions were obtained in the same manner as in Example 4 except that Copolymers (A2), (A3) and (A4) were separately used in place of Copolymer (A1).

EXAMPLE 8

A functional group-containing olefin copolymer containing the respective structural units in its corresponding proportions shown in Table 1 was produced in the same manner as in Example 4 except that no 5-ethylidene-2-norbornene was used, the amount of 5-methyl-5-carboxy-bicyclo[2.2.1]-2-heptene used was changed, and the feed rates of ethylene and propylene were changed. The functional group-containing olefin copolymer thus obtained is referred to as "Copolymer (A5)".

With respect to Copolymers (A5) thus obtained, the intrinsic viscosity [η] as measured in decalin at 135° C., the weight average molecular weight Mw in terms of polystyrene as measured by gel permeation chromatography and number average molecular weight Mn in terms of polystyrene, and the glass transition temperature as measured by means of a differential scanning calorimeter (DSC) are shown in Table 1.

A rubber composition was obtained in the same manner as in Example 4 except that 10 parts by weight of Copolymers (A5) and 90 parts by weight of an ethylene/propylene/5- ethylidene-2-norbornene copolymer (hereinafter referred to as "Copolymer (C1)") were used in place of 100 parts by weight of Copolymer (A1).

The above-described Copolymer (C1) is such that the structural unit derived from ethylene is 65.3 mol %, the structural unit derived from propylene is 33.6 mol %, the structural unit derived from 5-ethylidene-2-norbornene is 1.1 mol %, the intrinsic viscosity [η] is 1.75 dl/g as measured in decalin at 135° C., and the weight average molecular weights Mw is $17.3 \times 10^4$ in terms of polystyrene as measured by gel permeation chromatography and number average molecular weights Mn is $7.5 \times 10^4$ in terms of polystyrene.

A copolymer mixture was prepared by kneading 10 parts by weight of Copolymer (A5) and 90 parts by weight of Copolymer (C1), and the intrinsic viscosity [η] thereof was measured in decalin at 135° C. and found to be 1.58 dl/g. The contents of the respective structural units in this copolymer mixture were as follows:

The structural unit derived from ethylene being 64.9 mol %, the structural unit derived from propylene being 34 mol %, the structural unit derived from 5-methyl-5-carboxy-bicyclo[2.2.1]-2-heptene being 0.1 mol %, and the structural unit derived from 5-ethylidene-2-norbornene being 1.0 mol %.

Comparative Examples 5 to 7

Olefin copolymers having no functional group and containing the respective structural units in their corresponding proportions shown in Table 1 were produced in the same manner as in Example 4 except that no 5-methyl-5-carboxy-bicyclo[2.2.1]-2-heptene was used, the amount of 5-ethylidene-2-norbornene used was changed, and the feed rates of ethylene and propylene were changed. The olefin copolymers thus obtained are referred to as "Copolymer (X1)", "Copolymer (X2)" and "Copolymer (X3)", respectively.

With respect to Copolymers (X1) to (X3) thus obtained, the intrinsic viscosities [η] as measured in decalin at 135° C., the weight average molecular weights Mw in terms of polystyrene as measured by gel permeation chromatography and number average molecular weights Mn in terms of polystyrene, and the glass transition temperatures as measured by means of a differential scanning calorimeter (DSC) are shown in Table 1.

Rubber compositions were obtained in the same manner as in Example 4 except that Copolymers (X1), (X2) and (X3) were separately used in place of Copolymer (A1).

TABLE 1

| | | Example 4 Copolymer (A1) | Example 5 Copolymer (A2) | Example 6 Copolymer (A3) | Example 7 Copolymer (A4) | Example 8 Copolymer (A5) | Comparative Example 5 Copolymer (X1) | Comparative Example 6 Copolymer (X2) | Comparative Example 7 Copolymer (X3) |
|---|---|---|---|---|---|---|---|---|---|
| proportion of a structural unit (mol %) | structural unit derived from ethylene | 64.7 | 75.9 | 75.3 | 69.1 | 61.9 | 64.8 | 75.8 | 66.4 |
| | structural unit derived from propylene | 33 | 19.4 | 20 | 29 | 37.1 | 34 | 23 | 31 |
| | structural unit derived from MCBH *1 | 1.0 | 3.9 | 3.9 | 0.7 | 1.0 | — | — | — |
| | structural unit derived from ENB *2 | 1.3 | 0.8 | 0.8 | 1.2 | — | 1.2 | 1.2 | 2.6 |
| intrinsic viscosities (η) | | 1.77 | 2.16 | 1.69 | 2.63 | 0.20 | 1.73 | 2.22 | 2.07 |
| weight average molecular weight Mw ($\times 10^4$) | | 18.7 | 25.3 | 17.1 | 42.0 | 5.0 | 18.3 | 27.8 | 21.7 |
| number average molecular weight Mn ($\times 10^4$) | | 8.2 | 11.0 | 7.4 | 18.3 | 1.3 | 8.0 | 12.1 | 9.4 |
| glass transition temperature (° C.) | | −47.4 | −44.7 | −38.7 | −46.2 | −51.3 | −50.0 | −54.3 | −48.7 |

*1 MCBH: 5-methyl-5-carboxy-bicyclo(2.2.1)-2-heptene
*2 ENB: 5-ethylidene-2-norbornene

[Evaluation of Rubber Composition]

The respective rubber compositions obtained in Examples 4 to 8 and Comparative Examples 5 to 7 were subjected to roll retention test, adhesion test, tensile test, hardness test and DIN abrasion resistance test in accordance with the following respective methods. With respect to the tensile test, hardness test and DIN abrasion resistance test, each of the rubber compositions was heated for 30 minutes under a pressing pressure of 150 kgf/cm² by a hot press heated to 160° C. to produce a vulcanized rubber sheet, and specimens were prepared from this vulcanized rubber sheet.

(1) Roll Retention Test

Each of the rubber compositions obtained in Examples 4 to 8 and Comparative Examples 5 to 7 was masticated by roll mills with roll nips adjusted to 1 mm, 2 mm and 3 mm to evaluate the rubber composition as to roll retention in accordance with the following 5-rank standard:

5. A rubber band is in completely close contact with the surface of one roll, and a bank smoothly rotates;
  4. A rubber band sometimes separates from the surface of one roll between a bank and the top of said one roll;
  3. A rubber band frequently separates from the surface of one roll between a bank and the top of said one roll;
  2. A rubber band is not in sufficiently close contact with the surface of one roll and sags, and mastication cannot be conducted unless hands are lent the rubber band;
  1. A rubber band is in no close contact with the surface of one roll and sags, and mastication cannot be conducted unless hands are lent the rubber band.

(2) Adhesion

Each of the rubber compositions obtained in Examples 4 to 8 and Comparative Examples 5 to 7 was subjected to an adhesion test to a metal plate in accordance with JIS K 6256 to investigate a peeled or broken state. The metal plate (cast iron) used in this test was prepared by coating the surface thereof with a primer (Metalock P, trade name; product of Toyo Kagaku Kenkyusho), drying the primer for at least 30 minutes, further applying an adhesive (Metalock FC, trade name; product of Toyo Kagaku Kenkyusho) to the surface thereof and drying the adhesive for at least 30 minutes.

(3) Tensile Test

The tensile strength $T_B$ (MPa) and elongation EB (%) at break of each sample in accordance with JIS K 6301.

(4) Hardness Test

The durometer hardness of each sample was measured in accordance with JIS K 6253.

(5) DIN Abrasion Resistance Test

The abrasion resistance index of each sample was measured in accordance with JIS K 6264.

The results are shown in Table 2.

TABLE 2

|  |  | Example 4 | Example 5 | Example 6 | Example 7 | Example 8 | Comparative Example 5 | Comparative Example 6 | Comparative Example 7 |
|---|---|---|---|---|---|---|---|---|---|
| roll retention | roll mills with roll nips 1 mm | 5 | 4 | 5 | 4 | 5 | 4 | 3 | 3 |
|  | roll mills with roll nips 2 mm | 4 | 3 | 5 | 3 | 5 | 2 | 1 | 1 |
|  | roll mills with roll nips 3 mm | 4 | 3 | 5 | 3 | 5 | 2 | 1 | 1 |
| adhesion (a peeled or broken state) |  | broken material | broken material | broken material | broken material | broken material | peeled surface | peeled surface | peeled surface |
| the tensile strength $T_B$ [MPa] |  | 15.5 | 21.3 | 23.1 | 21.7 | 19.5 | 12.2 | 18.8 | 14.1 |
| elongation at break $E_B$ [%] |  | 330 | 250 | 220 | 270 | 360 | 330 | 320 | 240 |
| the durometer hardness A |  | 88 | 83 | 88 | 81 | 75 | 77 | 79 | 79 |
| the abrasion resistance index |  | 54 | 57 | 50 | 54 | 65 | 69 | 65 | 66 |

As apparent from Table 2, the rubber compositions according to Examples 4 to 8 can provide elastomers excellent in processability such as roll retention, and also in adhesion to metals, mechanical strength and abrasion resistance.

On the other hand, elastomers from the rubber compositions according to Comparative Examples 5 to 7 were inferior in processability and adhesion to metals.

As described above, the olefin copolymers according to the present invention permit providing elastomers which are high in adhesion to and compatibility with other materials, coating property and printability and excellent in durability, and give off no or little odor.

The production process according to the present invention permits exactly producing an olefin copolymer which can provide an elastomer which is high in adhesion to and compatibility with other materials, coating property and printability and excellent in durability, and gives off no or little odor.

The rubber compositions according to the present invention permit providing elastomers which are high in adhesion to and compatibility with other materials, coating property and printability and excellent in durability, mechanical properties and abrasion resistance, and give off no or little odor. In addition, molded or formed rubber products can be produced at low cost.

The elastomers obtained according to the present invention are suitable for use as a material for automotive parts such as weatherstrips and sponges, mechanical parts, electronic parts, civil engineering and construction materials, etc.

What is claimed is:

1. An olefin copolymer having a functional group, comprising:

a structural unit (a) obtained from ethylene, a structural unit (b) obtained from an α-olefin having 3 to 12 carbon atoms, and a structural unit (c) represented by the following formula (1), and having an intrinsic viscosity [η] of 0.1 to 10 dl/g as measured in decalin at 135° C.:

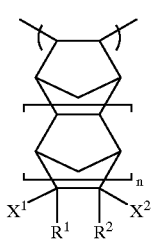

(1)

wherein $X^1$ and $X^2$ are, independently of each other, a hydrogen atom, a hydrocarbon group, or a functional group;

wherein at least one of $X^1$ and $X^2$ is said functional group;

wherein $R^1$ and $R^2$ denote, independently of each other, a hydrogen atom or a hydrocarbon group having 1 to 10 carbon atoms;

wherein one of $R^1$ and $R^2$, which is bonded to a carbon atom to which said functional group is bonded, is the hydrocarbon group having 1 to 10 carbon atoms; and wherein n is an integer of 0 to 2;

wherein said functional group is selected from the group consisting of a hydroxyl group, a hydrocarbon group to which a hydroxyl group is bonded, a carboxyl group, a hydrocarbon group to which a carboxyl group is bonded, a primary amino group, a secondary amino group, a hydrocarbon group to which a primary amino group or a secondary amino group is bonded, a quaternary ammonium salt of a primary or secondary amino group, a quaternary ammonium salt of a hydrocarbon group to which a primary or secondary amino group is bonded, an amide group having at least one active hydrogen atom bonded to a nitrogen atom, a hydrocarbon group to which an amide group having at least one active hydrogen atom bonded to a nitrogen atom is bonded, and an imide group consisting of $X^1$ and $X^2$ and represented by —CO—NH—CO—.

2. The olefin copolymer having the functional group according to claim 1, further comprising:

a structural unit (d) obtained from a nonconjugated diene, and having an intrinsic viscosity [η] of 0.1 to 10 dl/g as measured in decalin at 135° C.

3. The olefin copolymer having the functional group according to claim 2, wherein the structural unit (a) obtained from ethylene is 5 to 90 mol %, the structural unit (b) obtained from the α-olefin having 3 to 12 carbon atoms is 5 to 60 mol %, the structural unit (c) represented by formula (1) is 0.01 to 30 mol %, and the structural unit (d) obtained from a nonconjugated diene is 0 to 12 mol %.

4. The olefin copolymer having the functional group according to claim 1, wherein in the structural unit (c) represented by formula (1) only one of $X^1$ and $X^2$ in formula (1) is the functional group, and $R^1$ or $R^2$, which is bonded to the carbon atom to which the functional group is bonded, is a hydrocarbon group having 1 or 2 carbon atoms.

5. The olefin copolymer having the functional group according to claim 1, wherein in the structural unit (c) represented by formula (1) only one of $X^1$ and $X^2$ in formula (1) is the functional group, and $R^1$ or $R^2$, which is bonded to the carbon atom to which the functional group is bonded, is a hydrocarbon group having 1 or 2 carbon atoms, the other of $X^1$ and $X^2$ is a hydrogen atom, and $R^1$ or $R^2$, which is bonded to the carbon atom to which the hydrogen atom is bonded, is a hydrogen atom.

6. The olefin copolymer having the functional group according to claim 1, having a glass transition temperature of −90 to 50° C.

7. A process for producing an olefin copolymer having a functional group, which comprises the steps of:

reacting a functional group-containing cycloolefin represented by the following general formula (2) with an organometallic compound comprising a metal selected from metals of Groups 2, 12 and 13 of the periodic table, and polymerizing the resulting reaction product with ethylene, an α-olefin having 3 to 12 carbon atoms and a nonconjugated diene optionally used in the presence of a catalyst composed of a transition metal compound and an organoaluminum compound;

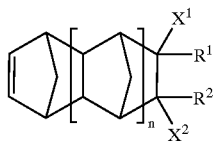

wherein $X^1$ and $X^2$ mean, independently of each other, a hydrogen atom, a hydrocarbon group or the following specific functional group, at least one of $X^1$ and $X^2$ is the specific functional group, $R^1$ and $R^2$ denote, independently of each other, a hydrogen atom or a hydrocarbon group having 1 to 10 carbon atoms, one of $R^1$ and $R^2$, which is bonded to a carbon atom to which the specific functional group is bonded, is the hydrocarbon group having 1 to 10 carbon atoms, and n stands for an integer of 0 to 2;

Specific functional group:

a functional group selected from the group consisting of a hydroxyl group, a hydrocarbon group to which a hydroxyl group is bonded, a carboxyl group, a hydrocarbon group to which a carboxyl group is bonded, a primary or secondary amino group, a hydrocarbon group to which a primary or secondary amino group is bonded, a quaternary ammonium salt of a primary or secondary amino group and a hydrocarbon group to which a primary or secondary amino group is bonded, an amide group having at least one active hydrogen atom bonded to a nitrogen atom, a hydrocarbon group to which such a amide group is bonded, and an imide group composed of $X^1$ and $X^2$ and represented by —CO—NH—CO—.

8. The process according to claim 7, wherein the organometallic compound comprising the metal selected from metals of Groups 2, 12 and 13 of the periodic table is an organoaluminum compound.

9. The process according to claim 7 or 8, wherein the organometallic compound comprising the metal selected from metals of Groups 2, 12 and 13 of the periodic table is used in a proportion of at least 0.8 equivalents per equivalent of the functional group in the functional group-containing cycloolefin represented by the general formula (2).

10. A rubber composition comprising:

(A) the olefin copolymer having the functional group according to claim 1 or 2; and (B) a vulcanizing agent and/or a crosslinking agent.

11. The rubber composition according to claim 10, which comprises (C) an olefin copolymer having no functional group.

12. The rubber composition according to claim 11, wherein (C) the olefin copolymer having no functional group is a copolymer comprising a structural unit derived from ethylene and a structural unit derived from an α-olefin having 3 to 12 carbon atoms, and/or a copolymer comprising a structural unit derived from ethylene, a structural unit derived from an α-olefin having 3 to 12 carbon atoms and a structural unit derived from a nonconjugated diene.

13. The rubber composition according to claim 11 or 12, wherein a ratio of (A) the olefin copolymer having the functional group according to any one of claims 1 to 4 to (C) the olefin copolymer having no functional group is 1:99 to 99:1 in terms of a weight ratio.

14. The olefin copolymer having the functional group according to claim 1, wherein the structural unit (a) obtained from ethylene is 5 to 90 mol %, the structural unit (b) obtained from the α-olefin having 3 to 12 carbon atoms is 5 to 60 mol %, and the structural unit (c) represented by formula (1) is 0.01 to 30 mol %.

15. The olefin copolymer having the functional group according to claim 2, wherein in the structural unit (c) represented by formula (1) only one of $X^1$ and $X^2$ in formula (1) is the functional group, and $R^1$ or $R^2$, which is bonded to the carbon atom to which the functional group is bonded, is a hydrocarbon group having 1 or 2 carbon atoms.

16. The olefin copolymer having the functional group according to claim 2, wherein in the structural unit (c) represented by formula (1) only one of $X^1$ and $X^2$ in formula (1) is the functional group, and $R^1$ or $R^2$, which is bonded to the carbon atom to which the functional group is bonded, is a hydrocarbon group having 1 or 2 carbon atoms, the other of $X^1$ and $X^2$ is a hydrogen atom, and $R^1$ or $R^2$, which is bonded to the carbon atom to which the hydrogen atom is bonded, is a hydrogen atom.

17. The olefin copolymer having the functional group according to claim 2, having a glass transition temperature of −90 to 50° C.

* * * * *